United States Patent [19]

Richardson

[11] Patent Number: 5,196,669
[45] Date of Patent: Mar. 23, 1993

[54] METHODS AND APPARATUS FOR SUPPLYING GAS UNDER HIGH PRESSURE TO WELDABLE AIR BAG VESSELS WITH A GAS PASSAGE FORMED THEREIN, AND LIKE PRODUCTS, AND THEN WELD-SEALING THE PASSAGE

[75] Inventor: Ronald W. Richardson, Essexville, Mich.

[73] Assignee: RWC, Inc., Bay City, Mich.

[21] Appl. No.: 790,531

[22] Filed: Nov. 12, 1991

[51] Int. Cl.⁵ .................. B23K 11/00; B65B 31/02; F16F 9/43; F17C 5/06
[52] U.S. Cl. ........................ 219/117.1; 53/403; 280/736
[58] Field of Search .......... 219/86.1, 93, 117.1; 228/176; 141/329; 53/403, 404, 79-83, 88, 97; 280/728, 729, 734, 736, 737

[56] References Cited

U.S. PATENT DOCUMENTS

| | | | |
|---|---|---|---|
| 1,708,868 | 4/1929 | Büderlin | 53/82 |
| 2,101,156 | 12/1937 | Payne | 219/117.1 |
| 2,141,932 | 12/1938 | Payne | 219/117.1 |
| 2,435,747 | 2/1948 | Larson | 53/404 |
| 2,786,374 | 3/1957 | Sharpe | 227/7 |
| 3,806,153 | 4/1974 | Johnson | 280/737 |
| 3,895,821 | 7/1975 | Schotthoefer et al. | 280/737 |
| 3,983,678 | 10/1976 | Bogler et al. | 53/7 |
| 3,985,375 | 10/1976 | Lewis et al. | 280/737 |
| 4,050,483 | 9/1977 | Bishop | 141/4 |
| 4,262,472 | 4/1981 | Soeda et al. | 53/403 |
| 4,439,976 | 4/1984 | Yuji et al. | 53/403 |
| 4,564,138 | 1/1986 | Bethell et al. | 228/176 |
| 4,712,353 | 12/1987 | Bethell et al. | 53/80 |
| 5,016,914 | 5/1991 | Faigle et al. | 280/741 |

FOREIGN PATENT DOCUMENTS

| | | |
|---|---|---|
| 0095552 | 7/1983 | European Pat. Off. |
| 107102 | 5/1984 | European Pat. Off. |
| 1196020 | 7/1965 | Fed. Rep. of Germany |

*Primary Examiner*—Geoffrey S. Evans
*Attorney, Agent, or Firm*—Learman & McCulloch

[57] ABSTRACT

A method and apparatus for supplying an inert gas under extreme pressure to a weldable air bag canister having a gas-charging opening in one end wall, and weld sealing the opening. The canister, and a composite welding head and weld ball supplying assembly, having a lower nose with a seal surrounding a ball dispensing opening therein, are relatively moved axially to seal off the opening in the canister end wall. Then, prior to pressurizing the assembly, an individual ball is presupplied through a passageway seal system to a ball delivery member inboard of the seals which are provided in the welding head and weld ball supplying assembly. Thereafter, the composite assembly is charged with gas under a heavy pressure measured in thousands of pounds per square inch, and a raiseable and lowerable welding electrode, carried by the assembly axially in alignment with the ball receiving chamber and ball dispensing opening, delivers welding current to melt collapse the ball to seal the opening. Finally, the electrode is moved back to retracted position and the assembly is depressurized.

19 Claims, 5 Drawing Sheets

METHODS AND APPARATUS FOR SUPPLYING GAS UNDER HIGH PRESSURE TO WELDABLE AIR BAG VESSELS WITH A GAS PASSAGE FORMED THEREIN, AND LIKE PRODUCTS, AND THEN WELD-SEALING THE PASSAGE

BACKGROUND OF THE INVENTION

The present invention relates to a system for supplying a gas to be stored in a vessel which releases the gas at the time of vehicle impact or collision to inflate a vehicle occupant restraint such as an air bag, and particularly to a system for supplying the gas and then weld-sealing the opening through which it is supplied. Typically, such bags are not inflated with air but, rather, nitrogen, carbon dioxide or helium. Normally such a vessel or canister also houses a gas-generating material separately from the stored, highly pressurized gas. A typical gas-generating material may comprise a halogen free alkali metal salt, an inorganic oxidizer, and a polyvinyl chloride binder which is ignited when a sensor discerns an imminent collision and the need for inflation of the bag. The generated gas ruptures a seal and is typically directed into the pressurized stored gas, with the pressure of the stored gas and the generated gas rupturing a second seal, which then permits the flow of the commingled gases into the inflatable device. An igniter material is provided within the canister to produce, typically, the heated gas to mix with the stored nitrogen gas. While, previously, systems for supplying a weldable ball to a weldable shock absorber chamber, having a specially configured opening pierced in its external casing wall, have been produced, as demonstrated, for instance, in the present assignee's European Patent application 83109775.3, filed Sep. 29, 1983 and published as No. 0107102, it should be understood that the pressure of the nitrogen gas supplied to the shock absorber chamber is much less than the pressure of the nitrogen gas which needs to be supplied to an air bag vessel or container. For example, the gas under pressure supplied to a shock absorber, is in the nature of 150 PSI, whereas the gas which is supplied to an air bag canister is in the nature of 3700 PSI. This very considerable difference in pressure renders systems which have been suitable for manufacturing shock absorbers, unsuited to the manufacture of air bag canisters. The above identified European patent publication, and the following list of patents, are exemplary of the prior art systems which have been employed, and are incorporated by reference herein:

|  | | |
|---|---|---|
| | 2,786,374 | Sharpe |
| | 3,806,153 | Johnson |
| | 3,895,821 | Schotthoefer et al |
| | 3,983,678 | Bogler et al |
| | 3,985,375 | Lewis et al |
| | 4,050,483 | Bishop |
| | 4,439,976 | Yuji et al |
| | 4,564,138 | Bethell et al |
| | 4,712,353 | Bethell et al |
| German | 1,196,020 | Boge |
| European patent publication | 0095552 | |

SUMMARY OF THE INVENTION

The present invention is concerned with a system which must be leakproof at pressures up to 4000 PSI. Whereas, previously, in the present assignee's mentioned European Patent publication, a single ball has been supplied to a delivery element outside a seal for the gas supply passage, the present system pre-supplies a welding ball to a position laterally inwardly of a complex of passage seals prior to the time that the gas charge is supplied, at a time when the gas supply and ball delivery passages are not under pressure. The system supports a weldable gas bag canister having an opening provided in its end wall axially below a composite welding head and weld ball delivery assembly having a lower nose end with a seal which engages the marginal wall of the canister around the opening. Prior to opening a valve to dispense gas under the enormous pressures required, individual balls are delivered to a plunger element having a ball receiving end portion disposed interiorly of the seal complex. With the ball pre-supplied and the ball supplying passages sealed off, pressurizing of the canister can take place, after which the ball is furnished to the opening in the canister. Thereafter, a raiseable and lowerable welding electrode moves axially in the ball receiving chamber to engage the dispensed ball and a welding current is applied to the electrode to melt-collapse the ball and weld it to close the opening and trap the gas charge therein. It is vital to the safety of the vehicle occupants that there be no material loss of pressure from air bag canister prior to the time it is required to perform its function. It is further necessary that there be a positive gas seal during the manufacturing operation contemplated.

With the foregoing in mind, it is a prime object of the present invention to provide a reliable and efficient high production method and apparatus for performing the functions described, which is trouble-free in nature under the high production rates required in the automotive supply manufacturing industry.

Another object of the invention is to provide a system which avoids complexity and will permit the transfer of only one ball at a time to the opening to be welded, while maintaining an insulated seal around the canister opening which prevents any leakage of the high pressure gas, protects the seal from weld expulsion, and guards against shorting and arcing.

Still another object of the invention is to furnish a system which effects the pretransfer of the welding ball to a position within the welding head inboard of the seal system for the sliding ball supplying plunger mechanisms.

Still another object of the invention is to provide a system providing for a flow of separated balls to the welding head through a seal system which prevents the high pressure gas from reaching and blowing the seals.

Other objects and advantages of the invention will become apparent with reference to the accompanying drawings and the accompanying descriptive matter.

GENERAL DESCRIPTION

Figure 1:
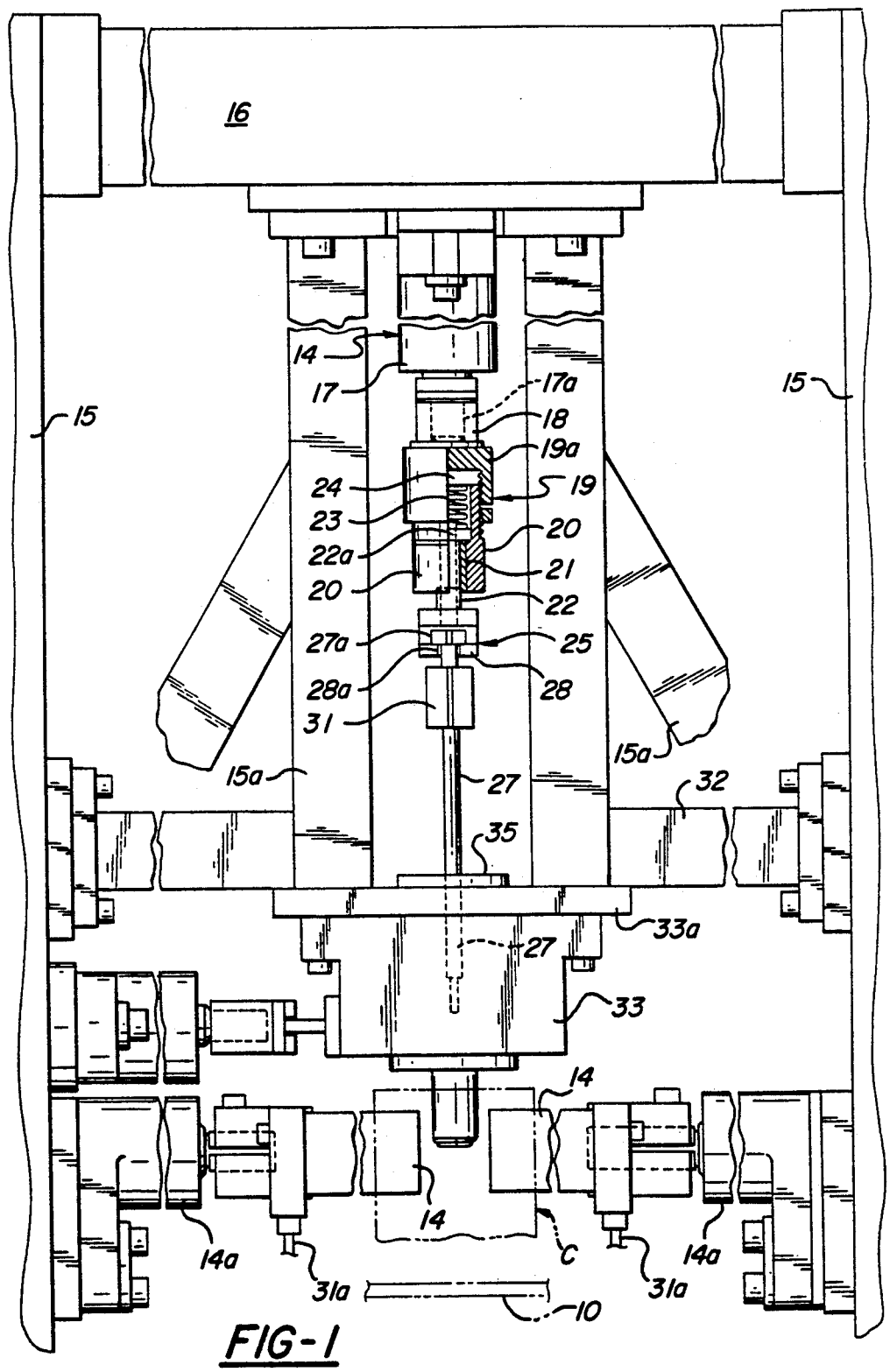
FIG. 1 is a partly sectional, front elevational view with the welding electrode shown in a raised position.
Figure 2:
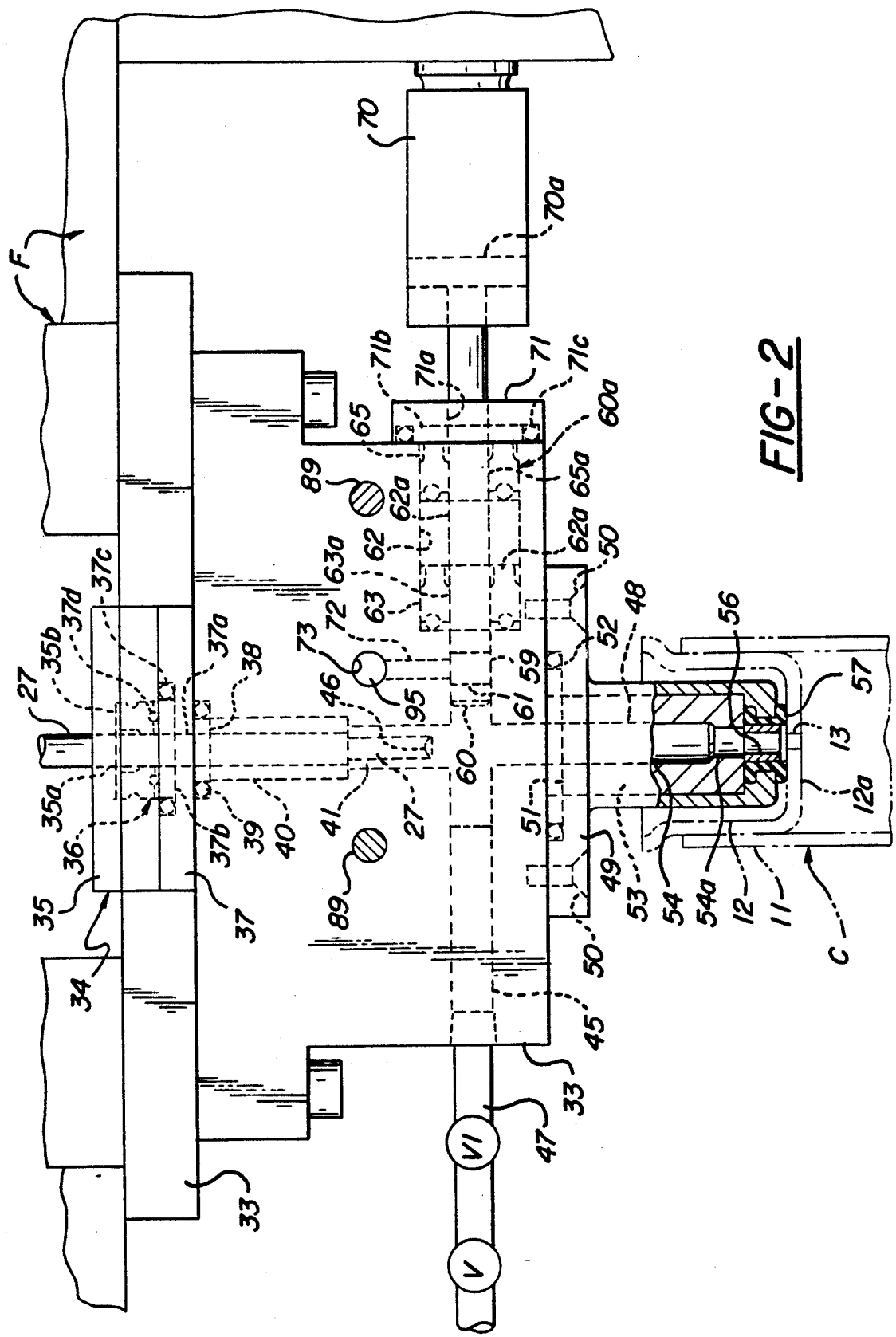
FIG. 2 is a fragmentary, rear elevational view.
Figure 3:
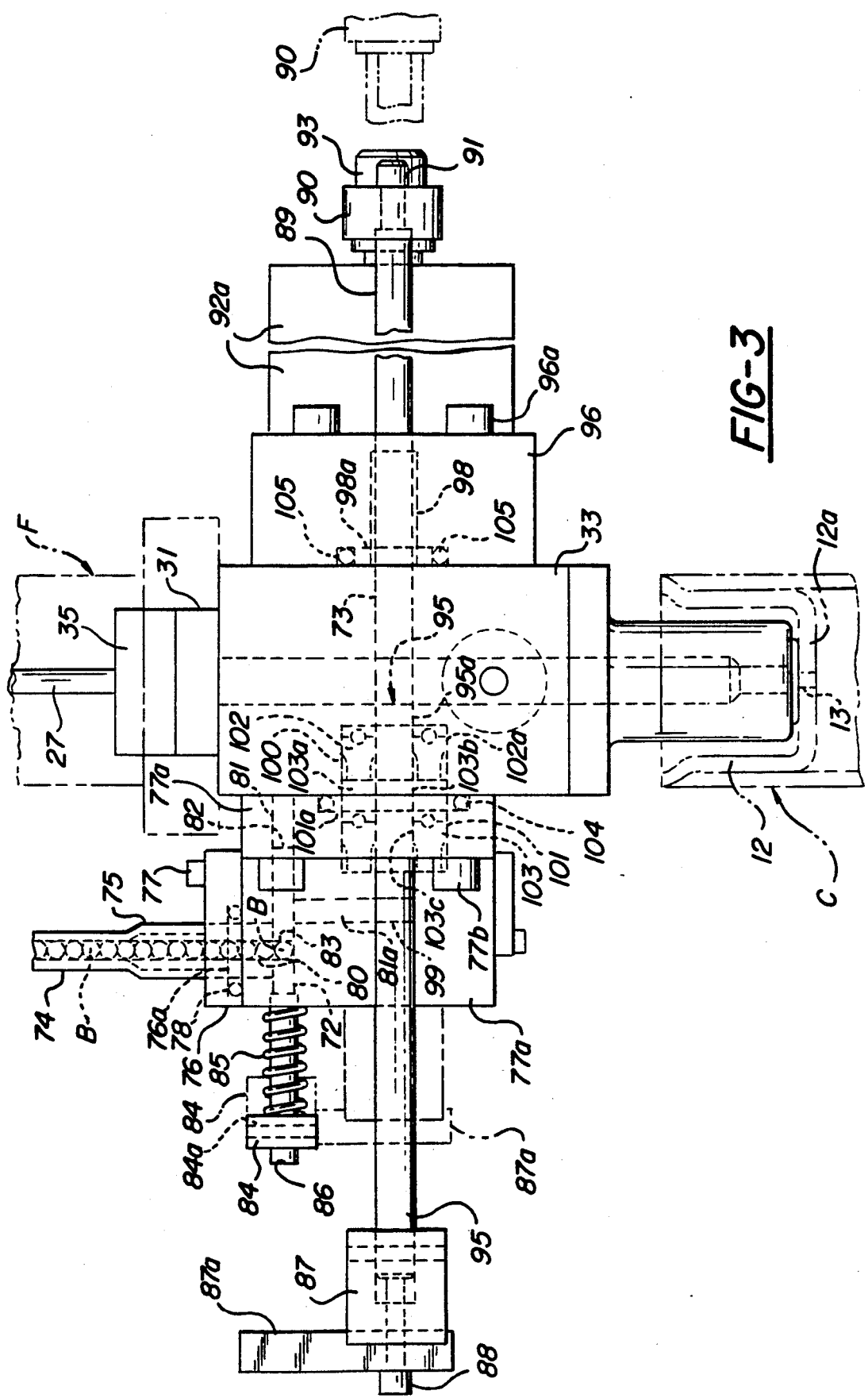
FIG. 3 is a fragmentary, end elevational view.

Referring now more particularly to the accompanying drawings, in FIGS. 1-3, I have shown a part lift and holder 10 for a gas bag canister, generally designated C, which includes an outer wall 11 and a cup-like end wall 12 which is previously welded in position. The canister is of typical construction and may be of the general type shown in U.S. Pat. No. 3,806,153, for example. Formed in the portion 12a of the end wall 12 is an opening or passage 13 for admitting gas under pressure to the interior of the canister C. While the portion 12a is illustrated as extending at 90° to the outer diameter of the canister wall 11, other configurations are possible and the welding head nose which presently will be described is configured to fit the end wall of the canister. It is this opening 13 which is to be closed by welding a steel welding ball B, which typically may be one-eighth to three-sixteenths of an inch in diameter in the gas charging opening 13, which typically is then respectively three thirty seconds to one-eighth of an inch in diameter. The ball B is melt-collapsed to seal the opening 13, after gas charging, in a pressure welding operation in a manner to be described.

The canister C may be held in position by secondary jaw clamps 14 operated by solenoid actuated, double acting cylinders 14a. While not shown, except schematically at 10, a positive locking lift platform to move the canister C up into welding position from below may be employed. For purposes of the present operation, it is only necessary that the canister C be maintained in stable position during the gas charging and welding operations. The lower lift assembly and secondary clamps are of conventional character and require no further description.

The frame F of the machine station includes side rails 15 and a headrail 16. Fixed to the headrail 16 is a ram cylinder mounted, electrode carrying head generally designated H. A double acting air cylinder 17 has a piston rod 17a connected by an electrically insulating member 18 to an adjustable spring housing coupling generally designated 19. The coupling 19 includes an upper cap 19a threadably, and therefore adjustably, receiving a lower housing member 20. Slide bushing 21, carried by the member 20, receives a plunger member 22, having a spring supporting seat 22a, receiving a coil spring 23 which is engageable with the spring seat 24 provided in member 19a. Plunger 22 carries a floating electrode coupling member 25. The coupling 25 comprises a collar fitting for supporting the welding rod 27, which has a collar 27a supported on a coupling lower wall 28 having an opening 28a for passing the welding rod 27.

Mounted on the welding rod 27 in any suitable manner is an electrically conductive terminal bar 31 which is connected to the primary of a transformer to supply welding current to electrode 27 at a predesignated time.

Figure 6:
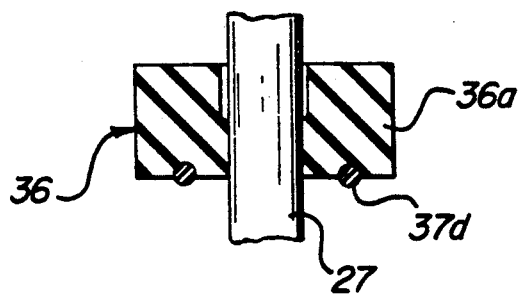
FIG. 6 is an enlarged sectional elevational view illustrating a typical rod seal structure.

Cross bars 32, supported by the frame side rails 15, mount a welding ball delivery and welding electrode guide assembly block, generally designated 33, which includes mechanism to be described for supplying a welding ball and the charging gas to the canister opening 13. It is to be observed that the mount plate 33a on the weld head support frame 32 is open to receive a seal plate assembly 34 (see FIG. 2) for the reciprocable welding rod 27. The seal plate assembly 34 includes plates 35 and 37, each of which is bored to pass the reciprocating welding rod 27 as at 35a and 37a respectively. The lower plate 37 is further grooved as at 37b to receive an O-ring seal 37c. Upper plate 35 is counter bored a at 35b to receive a seal 36 identified as a commercially available polypak seal having an O-ring 37d. The seal 36 which may be that marketed by Parker Hanafin Company is of the type demonstrated in FIG. 6 wherein a deformable plastic sleeve 36a surrounding the rod 27 is deformed by any increase in the pressure of the ambient atmosphere to grip the rod or member which it envelopes.

It will be seen that the upper surface of the block 33 is also grooved as at 38 to receive an O-ring seal 39 which, seals the mating surfaces as well as the guide bushing 40 provided in the block 33, through which the welding rod 27 extends. The bushing 40 extends to the reduced diameter portion 41 which communicates as shown in FIG. 2 with a crosswisely extending, intersecting passage 45. It is to be noted that in the retracted, or inoperative, position of the welding rod 27, its lower end is disposed just above the cross passage 45, and it is further to be noted that the welding rod 27 includes a hemispherically shaped pocket 46 in its lower end.

The passage 45 may be connected to a gas supply pipe 47 which communicates with a source of nitrogen gas and has a valve V which is manually or electrically energizeable to either admit, or not admit, gas from the source of supply to the passage 45. The valve V could be a commercially available, normally closed, solenoid-operated, spring returned gas valve and a commercially available valve V-1 is also employed which may be manually or electrically energized.

As will be noted, the electrode rod passage 41 extends below the passage 45 to communicate with a passage 48 in a seal head or nose part 49 which is affixed to the block 33 in any suitable manner, as by screws 50, and has a further grooved portion 51 housing an O-ring 52. The weld head nose 49 includes a sleeve 53 with its passage 48 axially aligned with passage 41. At a reduced size passage continuation 54a, a temperature resistant, insulating sleeve or bushing 56 is carried within a heat resistant sealing member 57. The sealing member 57 protrudes from the lower end of the seal head 49 to seal around the opening 13 when the lift assembly moves the canister C up into position to be clamped and compresses it. The sleeve 56 is vertically inset within the seal and is of a closely controlled length which allows the seal 56 to be compressed by the wall 12a sufficiently to form a tight seal.

In axial alignment with the gas supply passage 45 is a continuation passage 59 within which a ball delivery plunger 60 of cylindrical cross-section is slideably housed, the plunger having a bored opening 61 therethrough of a size which will permit the free passage of a welding ball B. The plunger 60, outboard of opening 61, passes through a seal assembly, generally designated 60a, provided in an enlarged, counter bore 62 in the block 33. The high pressure seal 60a, as shown in FIG. 2, includes members 63 and 65 of the same character as seal 36 separated by a spacer sleeve 62b. The members 63 through 65 provide passages 63a, 62a, and 65a for the plunger 60 which in effect is double sealed by the seals 63 and 65.

The plunger 60 may be actuated by a solenoid energized, double acting air cylinder 70 which is bolted to one of the side rails 15 of the frame F and is coupled to the piston 70a within cylinder 70. Also, a cover plate 71 having a bore 71a for the plunger 60 may be bolted to the block 33 by suitable bolt members, the plate 71 being grooved as at 71b to provide a chamber for an O-ring seal 71c.

When the plunger 60 is in the normal retracted position in which it is illustrated in FIG. 2, with the opening 61 therein withdrawn from passage 41, it is in communication with a vertical passage 72 in block 33 which feeds a ball down into the passage 61 in the plunger 60. The passage 72 communicates with a horizontal passage 73 which receives single balls B through a further passageway system to be described from a flexible tube 74 (FIG. 3) leading from a ball supply hopper (not shown). Tube 74 fits over a sleeve 75 which is received by a cap 76 bolted as at 77 to a fitting block 77a. The cap 76 is grooved as at 76a to accommodate an O-ring seal 78.

Provided in the block 77a, which is bolted as at 77b to head 33, is a passage 80 leading to a horizontal stripper bar passage 81 in block 77a in which a flat blade 82 is disposed. Bar 82 has a cylindrical opening 83 extending through it for accommodating only the single ball B which it strips from the stack of balls B in tube 75. The plunger 82 is pinned as at 84a to an actuator plate 84 which mounts return coil springs 85 between the plate and a bearing surface 77c on the block 77, around bolts 86.

Figure 4:
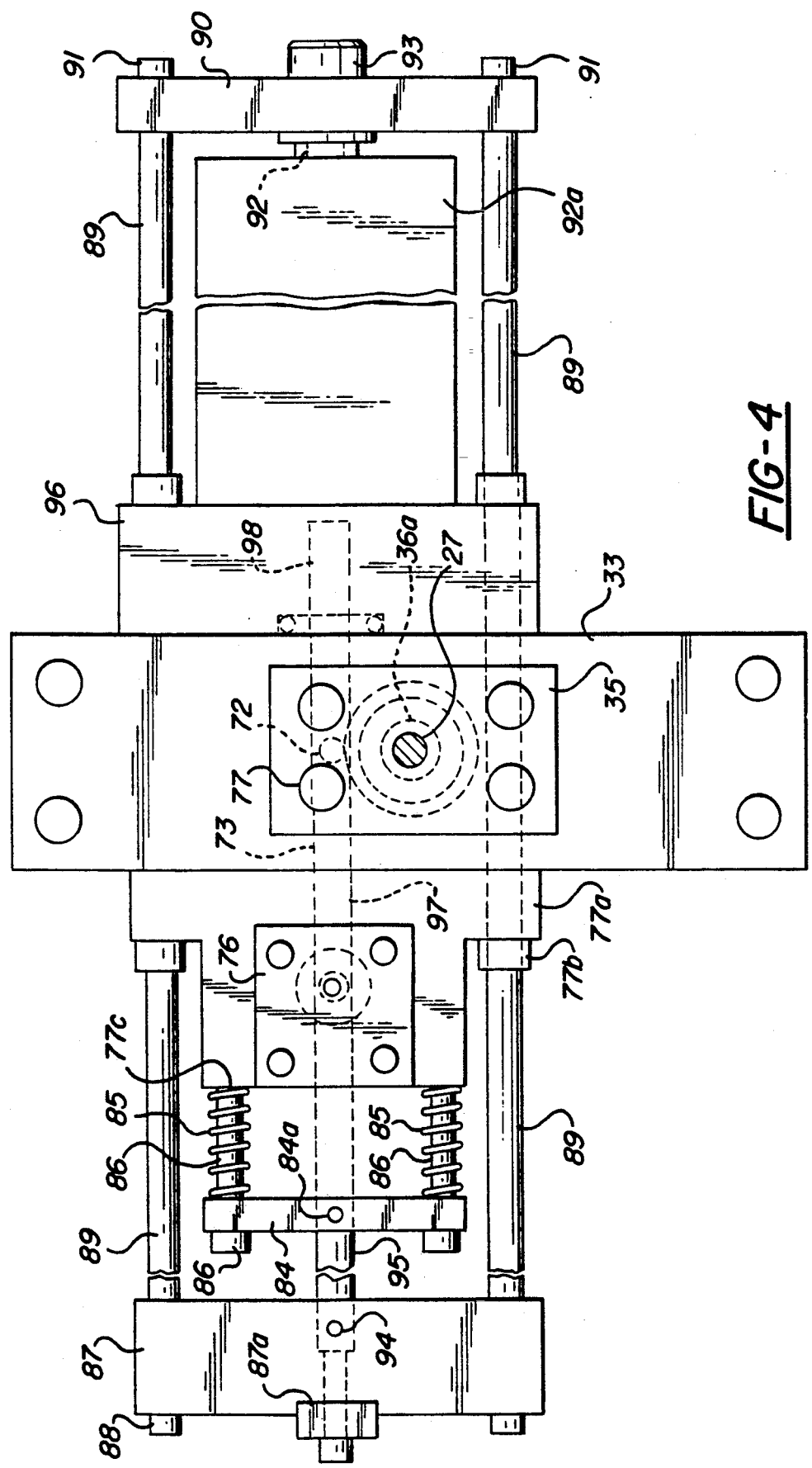
FIG. 4 is a fragmentary top plan view thereof.

Passage 81 communicates with a downwardly leading vertical passage 81a and, when the blade 82 is moved forwardly by a vertical striker plate 87a extending upwardly from a block 87 into the path of plate 84, the ball carried by blade 82 is delivered to passage 81a. The plate 87a and block 87 are connected by bolts 88 to pull rods 89 which extend to connect to an actuator plate 90, via bolts 91. As shown in FIG. 4, the piston rod 92 of a solenoid controlled, double acting, air cylinder 92a is connected by a fastener coupling 93 to plate 90 to operate pull rods 89 and move plunger 82 when plate 87a engages plate 84. The block 87 also is pinned as at 94 to a plunger of cylindrical cross-section 95 which is slideably received in a horizontal plunger passage generally designated 95a in blocks 77a and 33. A block 96 is bolted to block 97, 73 and 98 in the blocks 77a, 33, and 96 respectively. Passage 95a communicates directly with the vertical passage 72, plunger 95 having a single ball receiving cylindrical through bore 99 to deliver a ball B to passage 72.

Provided in block 33 and block 77a are counter bores 100 and 101 respectively for spaced apart seal members 102 and 103 which also are substantially identical to the seal 36. The seals 102 and 103 are spaced apart by a spacer sleeve 103a which provides vertical reinforcement for the seals and has a passage 103b slideably pass plunger 95. The plunger 95 also slideably passes through the passages 102a and 103c in seal members 102 and 103. An O-ring seal 104 is further provided in a grooved section 101a to seal the mating surfaces of blocks 77a and 33. In this way, the passage 95a is effectively sealed around the plunger 95. At the opposite end of passage 95a, the cylinder mount block 96 has a grooved section 98a for an O-ring seal 105.

It is to be noted that the primary of a welding transformer T is connected in circuit with power supply bar 31 and the cables 31a are connected to the secondary of the transformer for supplying the alternating current which effects the pressure welding operation. An alternating current circuit is required to achieve the weld speed which is necessary.

Figure 5:
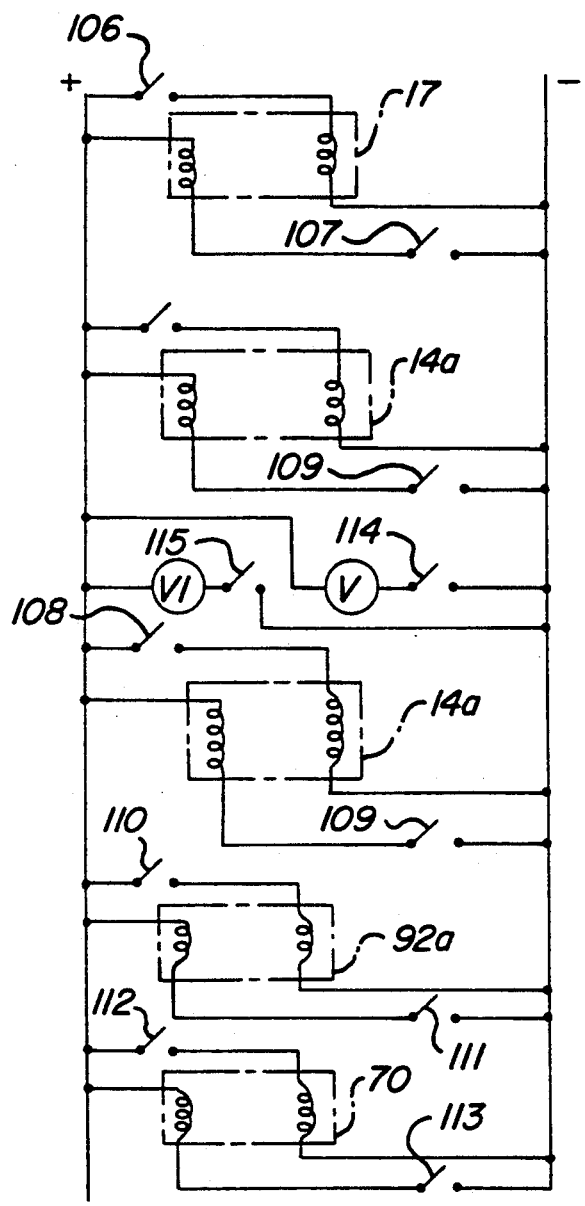
FIG. 5 is a schematic view of an electrical control circuit which may be employed.

In FIG. 5, only a schematic control circuit for the various air cylinders is illustrated for the sake of simplicity, and it is to be understood that a programmable controller is employed to operate the various switches shown in proper sequence. The extend and retract solenoids of the electrode operating cylinder 17 are operated by switches 106 and 107 respectively. The extend and retract solenoids of clamp cylinders 14a are operated by switches 108 and 109 respectively. Provided to operate the extend and retract solenoids of cylinder 92a are switches 110 and 111 respectively. Finally, the extend and retract solenoids of the cylinder 70 are operated by switches 112 and 113 respectively. If the valves V and V-1 are automatically operated by the programmable controller, the conventional gas valve may be operated by a switch 114 and the block valve V-1 by a switch 115.

THE OPERATION

In operation, and with the welding cylinder H and welding electrode 27 in retracted position, the first step in the cycle is the extension of the piston rod of cylinder 92a to the broken line position in FIG. 3 to move actuator plate 90 from left to right. A ball B, from the previous operation, will be in position in the opening 99 in plunger 95 and another ball B will be in position in the opening 83 in flat bar plunger 82. At this time, and with the valve V in closed position so that the system is not under pressure, pull rods 89 in FIGS. 3 and 4 move from left to right to move the ball in plunger 95 over to the opening 72 (FIG. 2), from which it drops to the through opening 72 into opening 61 in the plunger 60. During the final 0.62 inches of the stroke, striker plate 87a engages the plate 84 and moves it to the broken line position shown in FIG. 3. This moves plunger 82 also from left to right to deliver the ball B, prepositioned in passage 83 from the previous operation of cylinder 92a, over to the vertical passage 81a. When the piston rod of cylinder 92a is retracted, the ball released to passage 81a will become accommodated in the opening 99 in plunger 95. At the same time, when the springs 85 return the plunger 82, still another ball drops from the tube 75 into the through bore 80 into opening 83 in plunger 82. Thus, balls are replaced in the plunger or stripper rods 82 and 95 to be ready for the next cycle of operation.

Once a ball B is fed to the plunger through-bore 61 (FIG. 2) in plunger 60, a canister C is lifted into position by the positive locking lift device 10. At the time the welding head 49 is engaged by the wall 12a, the rubber seal 57 is compressed sufficiently to assure no gas leakage will occur. The amount of compression is also critical to prohibit shorting and arcing at the time of the weld.

With the canister C in place, the cylinders 14a can be energized to extend the clamp jaws 14 to grip and securely further lock the canister C in place. At this time, the valve V is opened to pressurize the canister to approximately 3700 PSI, the pressure then being bled back by valve V-1 to approximately 3200 PSI. When this pressure is reached, the extend solenoid of cylinder 70 is energized to move plunger 60 forwardly until the opening 61 is in axial alignment with the axis of passage 41. The ball B carried in bore 61 immediately drops vertically by gravity (since the system pressure is equalized throughout) and is guided to the opening 13 in the canister end wall 12a. As soon as the ball B drops, the retract solenoid of cylinder 70 is actuated and plunger 60 is restored to original position out of the path of the electrode rod 27.

Cylinder 17 is then energized to extend its piston rod and force the electrode 27 from the position in which its lower end is above the level of passage 45 down to a position in engagement with the ball B to be welded. Good electrical contact is made with the ball B, because of the ball accommodating cavity 46 which is provided in the lower end of the welding rod 27. At the time electrode 27 has fully descended, welding current is supplied via an on-off switch controlled by the programmable controller which communicates the transformer with the circuit lines to electrode 27 and conductive canister work holders 14. As the cylinder 17 continues to exert force against piston rod, spring 23 acts to continue to urge welding rod 27 downwardly and, as the ball B being welded collapses, rod 27 follows it to maintain welding contact until the opening-sealing weld is completed. The piston rod of cylinder 17 is then retracted to raise the electrode 27 to original position and the gaseous pressure in the passageway system in block 33 is relieved by closing valve V and bleeding off via bleeder valve V-1.

At this time, the cylinders 14a retract their piston rods to release the canister C and the lift (not shown) can be activated to lower the canister and its holder.

It is important that the ball carried by plunger 95 passes through the seal structure 102-103 and returns at a time when the system is not under the extreme pressures involved. Otherwise, the seal members 102 and 103 tend to be moved into the bore 99 and rupture. With the present system, seal rupture cannot occur because the ball B is already in position in the opening 61 in plunger 60, inboard of the seal assemblies 102-103, 36, and 63-65, during that part of the time the system is pressurized. The stripper and delivery system which prepositions the ball is so constructed and operated that the mechanism will remain leak-proof and operative during the continuous repetitive cycles involved in the high speed, air bag canister manufacturing operation.

What is claimed is:

1. A method for supplying gas under extreme pressure to a weldable air bag canister, having an opening in a wall thereof through which gas may be charged to the canister, and weld sealing the opening with a weldable welding ball, after the canister has been charged with an inert gas under a heavy pressure measured in thousands of pounds per square inch, the method employing an electrode welding head and weld ball supplying assembly having a lower tubular end with a seal surrounded a ball dispensing opening therein, a welding electrode and an element for moving it from a retracted position through said tubular end to an extended welding position, a reciprocable initial ball delivery element and a second reciprocable ball delivery element, each having ball receiving openings and being operable in a ball delivery passageway system, having upstream and downstream portions, provided in said assembly, and a deformable seal system forming part of the marginal wall of said ball delivery passageway system for sealing said reciprocable elements and passageway system, said initial ball delivery element being movable from a retracted position in which its ball accommodating opening is outside the assembly to a position inside said ball delivery passageway system, said second ball delivery element being disposed in a first retracted position in the downstream portion of said passageway system in which its ball accommodating opening is inboard of said seal system, comprising the steps of:

(a) relatively axially moving the canister and said electrode welding head and weld ball supplying assembly to dispose the seal surrounding the ball dispensing opening in said tubular end in abutting sealing relationship with the canister around the opening therein;

(b) separating individual balls from a supply thereof and furnishing them one at a time to said initial delivery element when its ball receiving opening is outside the assembly;

(c) moving said initial delivery element in a forward path of travel to move its ball receiving opening past said seal system and releasing the ball from said ball receiving opening to said second delivery element when its ball receiving opening is in said first position inboard of said seal system;

(d) only then supplying gas under pressure to said assembly to communicate with the tubular end of the electrode welding head and weld ball supplying assembly and the opening in the canister;

(e) moving said second delivery element in a forward path of travel to a second position in which its ball receiving opening communicates with said tubular end to supply a ball through the ball receiving opening in said second delivery element to the canister opening and then returning said second delivery element to retention position;

(f) moving said welding electrode from retracted to welding position and supplying a welding current to said electrode to weld the ball in said opening and seal said opening; and (g) depressurizing the said assembly and restoring the initial ball delivery element and electrode to retracted position.

2. The method of claim 1 wherein the welding current is an alternating current.

3. The method of claim 2 wherein the electrode is moved to keep it in current conducting contact with the collapsing ball, and the gas is a nonflammable gas such as nitrogen.

4. The method of claim 1 wherein said balls are separated from a vertical single file supply of balls by first accommodating the lowermost ball in the supply in an underlying stripper element port sized to accommodate only one ball, and moving the stripper element from the vicinity of the supply to a discharge position, the stripper element delivering the ball to a vertical passage and into said ball receiving part of said first delivery element.

5. The method of claim 1 comprising returning said first delivery element to a position in which its ball receiving part is outboard of said seal system prior to supplying said gas and pressurizing the assembly.

6. The method of claim 1 wherein said seal surrounding the ball dispensing opening in said lower end of said assembly comprises a resilient ring having an axially inset rigid ceramic sleeve with an axially outer end surface conforming flatwise to the configuration of the end wall of said canister around the charging opening therein, and controlling the axial compression of said resilient ring with said sleeve to achieve a tight seal preventing weld metal expulsion.

7. A method for supplying gas under extreme pressure to a weldable air bag canister, having an opening in a wall thereof through which gas may be charged to the canister, and weld sealing the opening with a collapsible welding ball, after the canister has been charged with an inert gas under a heavy pressure measured in thousands of pounds per square inch, the method employing an electrode welding head and weld ball supplying assembly having a lower tubular end with a seal surrounding a ball dispensing opening therein and an electrode movable through said tubular end from retracted to welding position, a reciprocable ball delivery part having a ball receiving opening and operable in a ball passageway system having an upstream and downstream portion in said assembly, and a deformable seal system in said passageway system and forming a part thereof for sealing said ball delivery part, the ball delivery part having a first retention position in the downstream portion of said passageway system in which its ball accommodating opening is inboard of said seal system and being movable to a second ball releasing position communicating with said tubular end of the assembly comprising the steps of:

(a) relatively axially moving the canister and said welding head and weld ball supplying assembly to dispose the seal in abutting sealing relationship with the canister around the opening therein;

(b) separating individual balls from a supply thereof and furnishing one at a time to said part opening;

(c) maintaining said ball delivery part in said retention position while; supplying gas under pressure to said assembly to communicate with the ball dispensing opening and the opening in the canister;

(d) then moving said ball delivery part from its retention to second ball releasing position to supply a ball from said ball receiving opening to said tubular end and the canister opening;

(e) moving said electrode to welding position and supplying a welding current to said electrode to weld the ball in said opening and seal said opening; and (f) depressurizing the said assembly and restoring the electrode to retracted position.

8. The method of claim 6 wherein the welding current is an alternating current.

9. Apparatus for delivering balls singly to an air bag canister having a weldable end wall with an opening therein for admitting gas to said canister, and welding a ball in position in said opening to seal it after the gas has been charged to it, comprising:

(a) a pressure sealed welding head and ball delivery assembly having a tubular portion with a tubular seal for engaging around a gas charging opening in the end of a gas bag canister, said assembly including a welding electrode and an element for moving it from a removed position down said tubular portion to contact a ball which has been delivered to said opening;

(b) said assembly being connected to a supply of gas under high pressure and having a gas passage leading to said tubular portion and communicating with a gas control operable to supply gas to said opening at a predetermined time;

(c) said assembly further having a ball delivery passage system with an upstream and downstream portion leading from outside said assembly to said tubular portion;

(d) a seal system in said assembly associated with said ball delivery passage system and having a marginal wall forming a part thereof;

(e) a first ball delivery mechanism for said ball delivery passage system having a ball accommodating portion movable from a position outside said assembly past said seal system to a position in said ball delivery passage system downstream from said seal system;

(f) a second ball delivery mechanism for receiving a ball from said first ball delivery system maintained in said passage system downstream from said first ball delivery element and having a ball accommodating portion maintained inboard of said seal system for keeping a ball predelivered by said first ball delivery mechanism from moving to said tubular portion until gas has been charged to said opening, and for then releasing said ball to said tubular portion to permit it to move to close said opening;

(g) electrical elements for supplying a welding current to said electrode; and (h) a control system operable to sequentially operate said first ball delivery mechanism to deliver a ball to said ball delivery passage system inboard of said seal system before said gas control is operated to charge said gas to said opening; to operate said second ball delivery mechanism after gas has been charged to said canister through said opening to deliver a ball to said opening to close it; and to then operate said element for moving said welding electrode to contact said ball and weld it in said opening to trap said gas charge therein.

10. The apparatus of claim 9 wherein said ball delivery passage system includes a first horizontal passage leading to a vertical passage which leads further to a second lower horizontal passage leading to said tubular portion, and said first ball delivery mechanism comprises a reciprocable plunger, having a through bore in one end for receiving a ball, accommodated snugly but reciprocably in said first horizontal passage, and mechanism for operating said plunger to move it to a forward position to drop a ball in said through bore into said vertical passage and then return said through bore to a removed position outside said assembly.

11. The apparatus of claim 10 wherein mechanism associated with a train of balls strips one individually from said train and supplies it to the through bore in said plunger when said plunger has returned to the removed position.

12. The apparatus of claim 10 wherein said second ball delivery mechanism comprises a second reciprocable plunger, also having a through-bore in an inner end for receiving a ball from said vertical passage, accommodated snugly but reciprocably in said second horizontal passage, and a driver for operating said second plunger to dispose it in a removed position in which its through-bore receives said ball from said vertical passage, and to move it after a time for gas charging to a forward position in which said through-bore drops the ball to said tubular portion and canister opening.

13. The apparatus of claim 12 wherein said driver for operating said second plunger returns it before said element for moving said welding rod down said tube to said canister opening is operated.

14. The apparatus of claim 12 wherein said second plunger has an end extending outside said assembly and said driver for operating it comprises a fluid pressure operated cylinder to which said plunger connects, and a seal system for said second plunger integrated with said second horizontal passage outboard of said vertical passage and the removed position of the through-bore in said second plunger.

15. The apparatus of claim 10 wherein said seal system comprises a seal for said first plunger integrated with said first horizontal passage at the upstream end thereof, upstream of said vertical passage.

16. Apparatus for delivering balls singly to an air bag canister having a weldable end wall with an opening therein for admitting gas to the canister, and for welding a ball in position in said opening to seal it after the gas has been charged comprising:
(a) a pressure sealed welding head and ball delivery assembly having a tubular portion with a tubular seal for engaging around a gas charging opening in the end of a gas bag canister, said assembly including a welding electrode and an element for moving it from a removed position down said tubular portion to contact a ball which has been delivered to said opening;
(b) said assembly being connected to a supply of gas under high pressure and having a gas passage leading to said tubular portion with a gas control operable to supply gas to said opening at a predesignated time;
(c) said assembly further having a ball delivery passage system, defined by a marginal wall with an upstream and downstream portion, leading from outside said assembly to said tubular portion;
(d) a deformable seal system in said assembly associated with said ball delivery passage system to form a part of the marginal wall thereof;
(e) ball delivery mechanism for said ball delivery passage system including a part having a ball accommodating portion movable from a position outside said assembly past said seal to a position in said ball delivery passage system downstream from said seal system, said ball delivery mechanism being operable to retain a ball in said passage system until gas has been charged to said opening, and then operable to release said ball to said tubular portion to permit it to move to close said opening;
(f) electrical elements for supplying a welding current to said electrode; and
(g) a control system operable to operate said ball delivery mechanism to deliver a ball to said ball delivery passage system inboard of said seal system before said gas control is operated to charge said gas to said opening, and then, after gas has been charged to said canister through said opening, to deliver a ball to said opening to close it; and to then operate said element for moving said welding electrode to contact said ball and weld it in said opening to trap said gas charge therein.

17. The apparatus of claim 16 wherein said tubular seal for the tubular portion of said assembly includes a resilient member mounting a ceramic sleeve in axially inset relation through which said welding electrode is received, the sleeve having an end wall surface conforming to the surface of the canister wall around the gas charging opening and controlling the compression of the resilient seal to achieve a tight seal preventing weld metal expulsion.

18. Apparatus for delivering weldable balls singly to an air bag canister having a weldable wall with a gas charging opening therein for charging gas to the canister, and for welding a ball in position in said opening to seal it after the gas has been charged; comprising:
(a) a pressure sealed welding head and ball delivery assembly having a tubular head portion with a tubular seal for engaging the canister around said gas charging opening, said assembly including a welding electrode and an element for moving it from a retracted position through said tubular head portion to an extended position contacting a ball which has been delivered to said gas charging opening;
(b) said assembly having a gas passage communicating with a supply of gas under high pressure and with said tubular head portion, and an openable and closeable gas control operable to supply gas from said supply to said gas passage at a predesignated time;
(c) said assembly further having a ball delivery passage system with an upstream and downstream portion defined by a marginal wall, leading from outside said assembly to said tubular head portion;
(d) a deformable seal system for said assembly associated with said ball delivery passage system and forming a part of said marginal wall thereof;
(e) a ball delivery mechanism for said ball delivery passage system having a ball delivery part slidable in said passage system, the ball delivery part having a ball accommodating passage with a ball therein movable from a retention position in said passage system in which the ball accommodating passage is inboard of said seal system to a second position in which said ball accommodating passage communicates with said tubular head portion to release a ball thereto and permit the released ball while exposed to the pressure of said gas to move to close said canister opening;
(f) electrical elements for supplying a welding current to said electrode; and
(g) a control system operable to maintain said ball delivery part in said retention position while opening said gas control to supply gas to said tubular portion and, only after gas has been charged to said canister, to move said ball delivery part from retention to said position to deliver a ball to said gas charging opening; and to then operate said element for moving said welding electrode from retracted position to contact said ball and energize said electrical elements and electrode to weld the ball in said opening and trap the gas charged.

19. The apparatus of claim 18 wherein said ball delivery mechanism includes a slidable element having a ball accommodating passage therein which is movable from a first position outside said assembly and outboard of said seal system to a second position in said upstream portion of said passage system inboard of said seal system to deliver a ball to said ball accommodating passage of said ball delivery part when the latter is in its retention position.

* * * * *

UNITED STATES PATENT AND TRADEMARK OFFICE
CERTIFICATE OF CORRECTION

PATENT NO. : 5,196,669
DATED : March 23, 1993
INVENTOR(S) : Ronald W. Richardson It is certified that error appears in the above-identified patent and that said Letters Patent is hereby corrected as shown below:

Column 4, line 3, change "a" (first occurrence) to -- as --.

Column 5, line 40, after "block" insert -- 33 as at 96a and passage 95a is made up of passages --.

Column 8, bridging lines 39-40, delete "such as nitrogen".

Column 10, line 49, change "driver" to -- drive --; line 55, change "driver" to -- drive --; line 61, change "driver" to -- drive --.

Column 12, line 45, change "said" (first occurrence) to -- second --.

Signed and Sealed this

Twenty-third Day of November, 1993

Attest:

BRUCE LEHMAN

Attesting Officer

Commissioner of Patents and Trademarks